(12) United States Patent
Oz

(10) Patent No.: US 11,582,494 B2
(45) Date of Patent: Feb. 14, 2023

(54) SYSTEM AND METHOD FOR CONTENT-LAYER BASED VIDEO COMPRESSION

(71) Applicant: PIXELLOT LTD., Petach Tikva (IL)

(72) Inventor: Gal Oz, Kfar Saba (IL)

(73) Assignee: PIXELLOT LTD., Petach Tikva (IL)

( * ) Notice: Subject to any disclaimer, the term of this patent is extended or adjusted under 35 U.S.C. 154(b) by 0 days.

(21) Appl. No.: 17/261,019

(22) PCT Filed: Jul. 16, 2019

(86) PCT No.: PCT/IL2019/050800
§ 371 (c)(1),
(2) Date: Jan. 17, 2021

(87) PCT Pub. No.: WO2020/016891
PCT Pub. Date: Jan. 23, 2020

(65) Prior Publication Data
US 2021/0297715 A1 Sep. 23, 2021

Related U.S. Application Data

(60) Provisional application No. 62/699,753, filed on Jul. 18, 2018.

(51) Int. Cl.
*H04N 21/2343* (2011.01)
*H04N 19/20* (2014.01)
(Continued)

(52) U.S. Cl.
CPC ..... *H04N 21/234327* (2013.01); *H04N 19/20* (2014.11); *H04N 21/2402* (2013.01); *H04N 21/2662* (2013.01)

(58) Field of Classification Search
CPC ........... H04N 21/234327; H04N 19/20; H04N 21/2402; H04N 21/2662; H04N 19/136; H04N 19/37; H04N 19/132
See application file for complete search history.

(56) References Cited

U.S. PATENT DOCUMENTS 5,557,684 A * 9/1996 Wang .................. H04N 19/543
375/E7.111
5,828,788 A * 10/1998 Chiang ................. H04N 19/37
375/E7.091
(Continued)

OTHER PUBLICATIONS

International Search Report for PCT Application No. PCT/IL2019/050800, dated Nov. 26, 2019.
(Continued)

*Primary Examiner* — Robert J Hance
(74) *Attorney, Agent, or Firm* — Pearl Cohen Zedek Latzer Baratz LLP

(57) ABSTRACT

Embodiments of the present invention disclose a method of content-layer based compression of a video being broadcasted over a network. The method may include: receiving a video stream comprising a plurality of video stream frames; identifying in at least some of the plurality of video stream frames at least two content-layers of predefined content-layers to yield corresponding at least two content-layer streams, wherein each of the at least two content-layer streams is associated with one of the at least two content-layers; and compressing each of the at least two content-layer video streams according to predetermined parameters of the content-layer associated with the respective content-layer video stream and according to available resources of the network to yield corresponding at least two compressed content-layer streams.

11 Claims, 5 Drawing Sheets

232

| Content-layer | Visual element in scene 80 | Bandwidth ratio (% of network bandwidth) | Minimal bandwidth (arbitrary units) | Priority value (1 - High) | Framerate | Resolution | |
|---|---|---|---|---|---|---|---|
| 232(1) 1st content-layer | 234(1)/82 | 60% | 2 | 1 | 1 (full) | 1 (full) | 236(1) |
| 232(2) 2nd content-layer | 234(2)/84 | 30% | 1 | 2 | 1/2 | 1/2 | 236(2) |
| 232(3) 3rd content-layer | 234(3)/86 | 10% | 0.75 | 3 | 1/4 | 1/6 | 236(3) |

232    234            236

(51) Int. Cl.
*H04N 21/24* (2011.01)
*H04N 21/2662* (2011.01)

(56) References Cited

U.S. PATENT DOCUMENTS

| | | | | |
|---|---|---|---|---|
| 6,091,777 | A * | 7/2000 | Guetz | H04N 19/635 375/240.03 |
| 2006/0017985 | A1 * | 1/2006 | Kim | H04N 19/137 375/E7.182 |
| 2011/0004912 | A1 * | 1/2011 | Teniou | H04N 21/25891 375/E7.076 |
| 2011/0311207 | A1 * | 12/2011 | Urabe | H04N 21/234327 386/353 |
| 2013/0195172 | A1 | 8/2013 | Wang et al. | |
| 2014/0289369 | A1 | 9/2014 | Yang et al. | |
| 2015/0117545 | A1 | 4/2015 | Fu et al. | |
| 2015/0189338 | A1 | 7/2015 | Lam et al. | |
| 2016/0021391 | A1 * | 1/2016 | Su | H04N 19/30 375/240.12 |
| 2020/0275134 | A1 * | 8/2020 | Bang | H04N 21/21805 |

OTHER PUBLICATIONS

Ebrahim T. et al: "MPEG-4 naturak video coding—An overview", Signal Processing. Image Communication, Elsevier Science Publishers, Amsterdam, NL, vol. 15, No. 4-5, Jan. 1, 2000. pp. 365-385.

Extended Search Report for European Patent Application No. 19837769.9, dated Mar. 7, 2022.

Paulo Nunes et al.: "Object-based rate 1-15 control for the MPEG-4 visual simple profile", Internet Citation, Jan. 1, 1999, pp. 1-3.

Paulo Nunes et al.: "Rate Control in Object-Based Video Coding Frameworks", 44. MPEG Meeting; Jul. 6, 1998-Jul. 10, 1998; Dublin; Jun. 30, 1998.

Qing Wu et al.: "A Convex Optimization-Based Object-Level Rate Control Algorithm for MPEG-4 Video Object Coding", Circuits and Systems, 2006. APCCAS 2006. IEEE Asia Pacific Conference On, IEEE, Piscataway, NJ, USA, Dec. 1, 2006, pp. 784-787.

Sikora T et al.: "MPEG-4 video and its potential for future multimedia services", Proceedings of 1997 IEEE International Symposium on Circuits and Systems, 1997. ISCAS '97., Hong Kong Jun. 9-12, 1997, New York, NY, USA, IEEE, US, vol. 2, Jun. 9, 1997, pp. 1468-1471.

Yu Sun et al.: "A robust and adaptive rate 1-15 control algorithm for object-based video coding", IEEE Transactions on Circuits and Systems, for Video Technology, IEEE, USA, vol. 14, No. 10, Oct. 1, 2004 (Oct. 1, 2004), pp. 1167-1182.

Zhijun Lei et al: "Video transcoding gateway for wireless video access", Proceedings / CCECE 2003, Canadian Conference on Electrical and Computer Engineering: Toward a Caring and Humane Technology; May 4 to 7, 2003, Montreal, Canada, IEEE, New York, NY, US, vol. 3, May 4, 2003, pp. 1775-1778.

* cited by examiner

| Content-layer | Visual element in scene 80 | Bandwidth ratio (% of network bandwidth) | Minimal bandwidth (arbitrary units) | Priority value (1 - High) | Framerate | Resolution |
|---|---|---|---|---|---|---|
| 232(1) 1st content-layer | 234(1)/82 | 60% | 2 | 1 | 1 (full) | 1 (full) |
| 232(2) 2nd content-layer | 234(2)/84 | 30% | 1 | 2 | 1/2 | 1/2 |
| 232(3) 3rd content-layer | 234(3)/86 | 10% | 0.75 | 3 | 1/4 | 1/6 |

*Figure 2B*

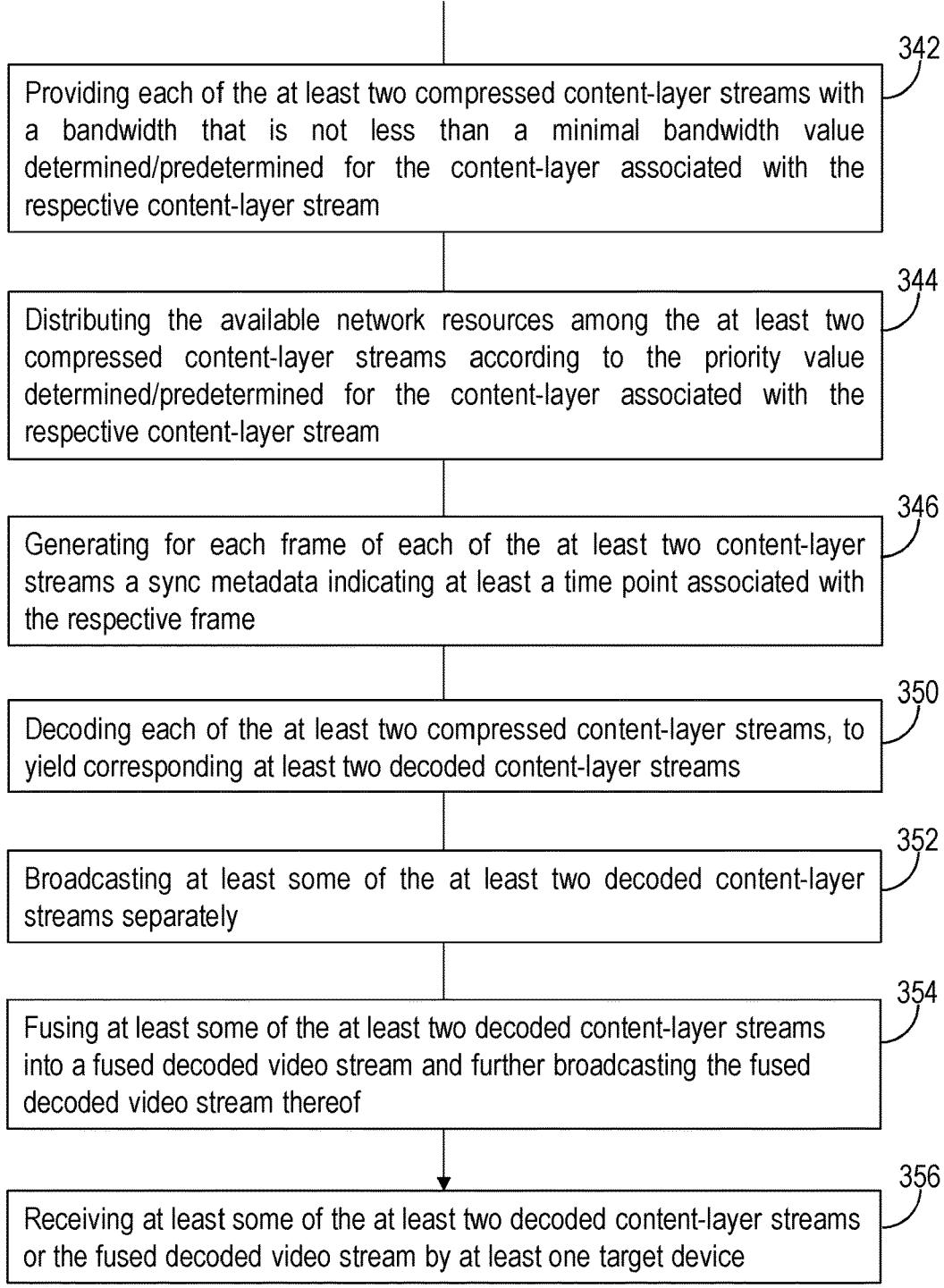
Figure 3 (cont. 1)

SYSTEM AND METHOD FOR CONTENT-LAYER BASED VIDEO COMPRESSION

CROSS-REFERENCE TO RELATED APPLICATIONS

This application is a National Phase Application of PCT International Application No. PCT/IL2019/050800, International Filing Date Jul. 16, 2019, entitled: "SYSTEM AND METHOD FOR CONTENT-LAYER BASED VIDEO COMPRESSION", published on Jan. 23, 2020, under PCT International Application Publication No. WO 2020/016891, which claims the benefit of U.S. Provisional Patent Application No. 62/699,753, filed on Jul. 18, 2018, which is hereby incorporated by reference in its entirety.

FIELD OF THE INVENTION

The present invention relates to the field of video compression, and more particularly, to the field of content-layer based video compression.

BACKGROUND OF THE INVENTION

Generally, an uncompressed video requires a very high data rate. Typically, video data (that typically includes a plurality of still frames) contains abundant amounts of spatial and temporal redundancy. Current video compression methods typically exploit these spatial and temporal redundancy, for example through difference coding. For example, similarities can be encoded by only storing differences between temporally adjacent frames (inter-frame coding) and/or spatially adjacent pixels (intra-frame coding).

Current video compression methods can further employ lossy compression techniques (e.g., quantization) that reduce aspects of the source data that are irrelevant to the human visual perception by exploiting perceptual features of human vision. For example, small differences in color are more difficult to perceive than are changes in brightness. These compression algorithms can average a color across these similar areas to reduce space.

SUMMARY OF THE INVENTION

One aspect of the present invention provides a method of content-layer based compression of a video being broadcasted over a network, the method may include: receiving a video stream including a plurality of video stream frames; identifying in at least some of the plurality of video stream frames at least two content-layers of predefined content-layers to yield corresponding at least two content-layer streams, wherein each of the at least two content-layer streams is associated with one of the at least two content-layers; and compressing each of the at least two content-layer video streams according to predetermined parameters of the content-layer associated with the respective content-layer video stream and according to available resources of the network to yield corresponding at least two compressed content-layer streams.

Another aspect of the present invention provides a system for content-layer based compression of a video being broadcasted over a network, the system may include: an identification module arranged to: receive a video stream including a plurality of video stream frames; identify in at least some of the plurality of video stream frames at least two content-layers of predefined content-layers, to yield corresponding at least two content-layer streams, wherein each of the at least two content-layer streams is associated with one of the at least two content-layers; and a compression module arranged to compress each of the at least two content-layer video streams according to predetermined parameters of the content-layer associated with the respective content-layer video stream and according to available resources of the network to yield corresponding at least two compressed content-layer streams.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIG. 2B is a table showing an example of a database of predefined content-layers and respective content-layers' predetermined identification parameters and predetermined compression parameters, according to some embodiments of the invention.

Figure 1:
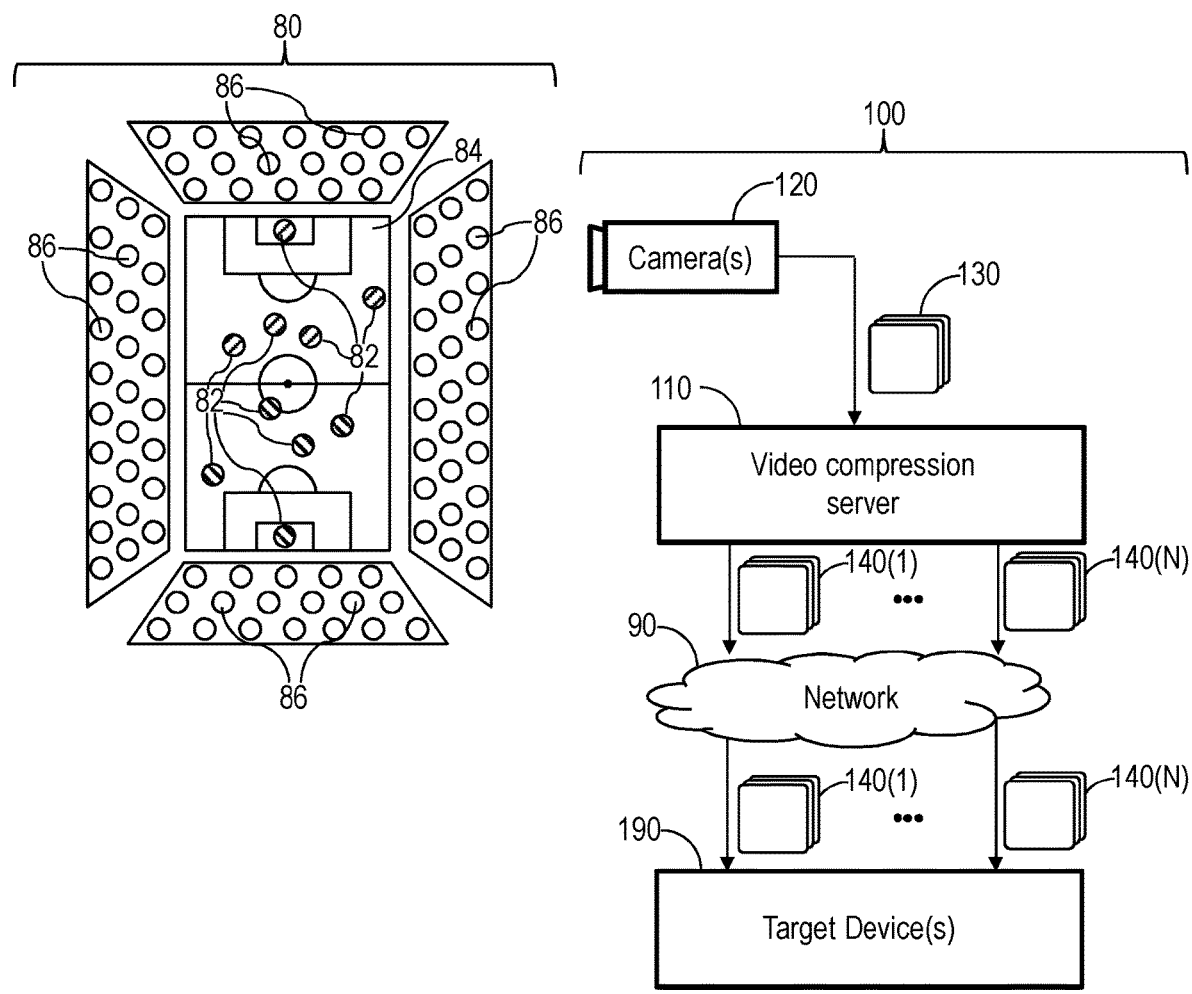
FIG. 1 is a schematic illustration of a system for content-layer based video compression, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Reference is now made to FIG. 1, which is a schematic illustration of a system 100 for content-layer based video compression, according to some embodiments of the invention.

According to some embodiments, system 100 may include a video compression server 110 and at least one target device 190 in communication with video compression server 110. In some embodiments, the communication of target device(s) 190 with video compression server 110 may be, for example, over a network 90 (e.g., as shown in FIG. 1).

In some embodiments, system 100 may include at least one video camera 120. Video camera(s) 120 may be directed at a scene 80 of, for example, a sport event (such as soccer, basketball, football, etc.). Scene 80 may include multiple scene elements such as, for example, players 82, playing surface 84 and/or audience 86. Video camera(s) 120 may generate video footage and deliver a video stream 130 to video compression server 110. Alternatively or complementarily, video stream 130 may include a prerecorded video being broadcasted to video compression server 110 (not shown).

According to some embodiments, video compression server 110 may receive video stream 130. Video stream 130 may include a plurality of video stream frames. Video compression server 110 may identify, in at least some of the plurality of video stream frames, at least two content-layers, to yield corresponding at least two content-layer streams, wherein each of the at least two content-layer streams may be associated with one of the at least two content-layers. Each of the at least two content-layers may be associated with at least one of the multiple visual elements is scene 80, such as, for example, players 82, playing surface 84, audience 86 (e.g., as described below with respect to FIGS. 2A and 2B).

Video processing server 110 may compress each of the at least two content-layer streams according to (or based on) predetermined parameters of the content-layer associated with the respective content-layer streams and/or according to (or based on) given/available network parameters of network 90 (e.g., bandwidth), to yield corresponding at least two compressed content-layer streams 140(1) to 140(N) (e.g., where N≥2). It would be appreciated that the compression of the content-layer streams may be done using any know video compression formats known in the art (such as H244, H265, etc.).

In some embodiments, the predetermined parameters of the content-layers may, for example, include at least one of: identification parameters, bandwidth, minimal bandwidth, priority value, framerate, resolution, quantization levels, etc., that may be determined/predetermined for each of the at least two content-layers thereof.

In some embodiments, the content-layer based compression thereof may be configured to enhance a quality of predetermined content-layers (e.g., content-layers associated with players 82, playing surface 84, etc.) by, for example, providing these content-layers with more network resources (e.g., bandwidth, framerate, etc.) as compared to other content-layers (e.g., content-layers associated with audience 86).

According to some embodiments, video compression server 110 may broadcast at least two compressed content-layer streams 140(1) to 140(N) to at least one target device 190. Target device(s) 190 may be, for example, a cloud or viewer device(s) (such as smart TV; smartphone, etc.).

Target device(s) 190 may decode at least two compressed content-layer streams 140(1) to 140(N) to yield corresponding at least two decoded content-layer streams (e.g., as described below with respect to FIG. 2A). In various embodiments, target device(s) 190 may use at least some of the decoded content-layer streams separately or fuse at least some of the decoded content-layer streams into a fused decoded video stream (e.g., as described below with respect to FIG. 2A).

Figure 2A:
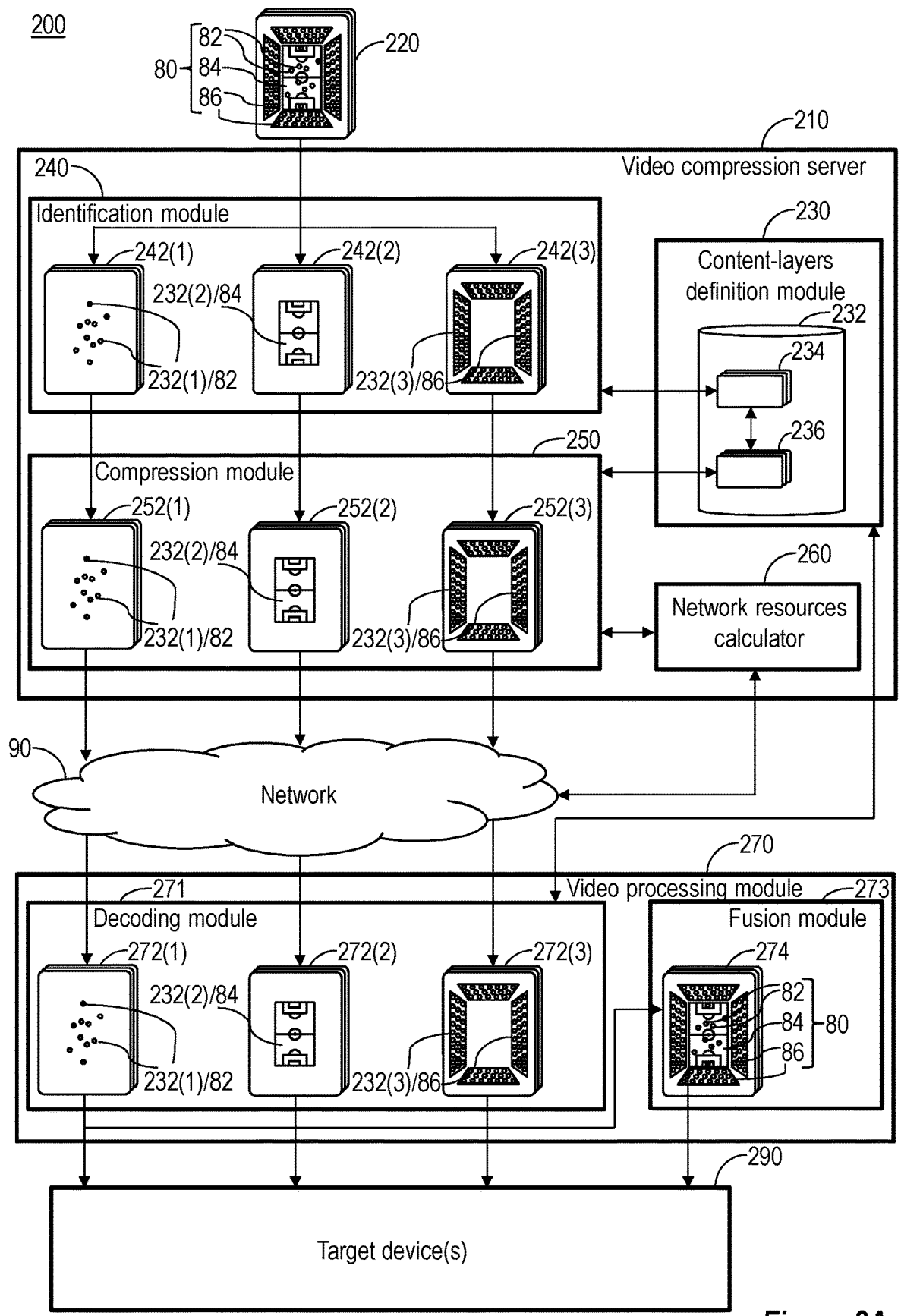
FIG. 2A is a more detailed aspect of a system for content-layer based video compression, according to some embodiments of the invention.

Reference is now made to FIG. 2A, which is a more detailed aspect of a system 200 for content-layer based video compression, according to some embodiments of the invention.

Reference is also made to FIG. 2B, which is a table showing an example of a database 232 of predefined content-layers and respective content-layers' predetermined identification parameters 234 and predetermined compression parameters 236, according to some embodiments of the invention.

According to some embodiments, system 200 may include a video compression server 210 (e.g., as shown in FIG. 2A). Video compression server 210 may receive a video stream 220. Video stream 220 may include a plurality of video stream frames, each representing scene 80. For example, FIG. 2A shows video stream 220 representing scene 80 of soccer sport event including multiple visual elements such as players 82, playing surface 84 and audience 86.

According to some embodiments, video compression server 210 may include a content-layers definition module 230 (e.g., as shown in FIG. 2A).

Content-layers definition module 230 may include a database 232 of predefined content-layers. Predefined content-layers 232 may be determined by respective content-layers' identification parameters 234 and respective content-layers' compression parameters 236 (e.g., as shown in FIG. 2A). In various embodiments, content-layers 232, content-layers' identification parameters 234 and/or content-layers' compression parameters 236 may be predetermined and/or updated by a user of system 200.

For example, FIG. 2B shows database 232 that includes a first content layer 232(1) having a first set of identification parameters 234(1) associated with players 82 and a first set of compression parameters 236(1); a second content-layer 232(2) having a second set of identification parameters 234(2) associated with playing surface 84 and a second set of compression parameters 236(2); and a third content-layer 232(3) having a third set of identification parameters 234(4) associated with audience 86 and a third set of compression parameters 236(3).

In some embodiments, compression parameters 236 of each of predefined content-layers 232 may include bandwidth ratio (e.g., of the available network bandwidth), minimal bandwidth value (e.g., in Mbps), priority value (e.g., priority value 1 is for high priority), framerate (e.g., 1 (full), ½, ¼, etc.), resolution (1 (full), ½, ¼, etc.), etc., determined for the respective content-layer of content-layers 232 (e.g., as shown in FIG. 2B).

For example, first and second content-layers 232(1), 232(2) associated with players 82 and playing surface 84, respectively, may be of particular interest for target viewers and thus may have improved first and second sets of compression parameters 236(1), 236(2) as compared third set of compression parameters 236(3) of third content layer 232(3) (e.g., as shown in FIG. 2B).

According to some embodiments, video compression server 210 may include an identification module 240. Identification module 240 may be associated with content-layers definition module 230.

Identification module 240 may identify in at least some of the plurality of video stream frames, at least two content-layers of predefined content-layers 232 (e.g., based on the respective at least two content-layers' identification parameters 234), to yield corresponding at least two content-layer streams 242(1) to 242(N) (e.g., where N≥2), wherein each of at least two content-layer streams 242(1) to 242(N) may be associated with one of the at least two content-layers.

For example, FIG. 2A shows a first content-layer stream 242(1) associated with first content-layer 232(1) (e.g., players 82), a second content-layer stream 242(2) including the plurality of frames and associated with second content-layer 232(2) (e.g., playing surface 84) and/or a third content-layer stream 242(3) including the plurality of frames and associated with third content-layer 232(3) (e.g., audience 86).

According to some embodiments, video compression server 210 may include a compression module 250 (e.g., as shown in FIG. 2A). Compression module 250 may be associated with content-layers definition module 230, identification module 240 and/or with a network resource calculator 260.

Compression module 250 may compress each of at least two content-layer streams 242(1) to 242(N) according to (or based on) the compression parameters (of compression parameters 236) of the content-layer (of predefined content-layers 232) associated with the respective content-layer stream and according to (or based on) given (available) network resources (e.g., determined by network resource calculator 260), to generate corresponding at least two compressed content-layer streams 252(1) to 252(N) (e.g., a first compressed content-layer stream 252(1), a second compressed content-layer stream 252(2) and a third compressed content-layer stream 252(3), as shown in FIG. 2A). It would be appreciated that the compression of content-layer streams 242(1) to 242(N) may be done using any know video compression formats known in the art (such as H244, H265, etc.).

For example, compression module 250 may provide first compressed content-layer stream 252(1) associated with first content-layer 232(1) with 60% of a total bandwidth of network 90, full resolution and full framerate as compared to original video stream 220 (e.g., according to first set pf compression parameters 236(1), as shown in FIG. 2B). In the same example, compression module 250 may provide second compressed content-layer stream 252(2) associated with second content-layer 232(2) with 30% of the total bandwidth of network 90, ½ of framerate and ½ of resolution as compared to original video stream 220 (e.g., according to second set of compression parameters 236(2), as shown in FIG. 2B). Yet in the same example, compression module 250 may provide third compressed content-layer stream 252(3) associated with third content-layer 232(3) with 10% of the total bandwidth of network 90, ¼ of framerate and ⅙ of resolution as compared to original video stream 220 (e.g., according to third set of compression parameters 236(3), as shown in FIG. 2B).

In some embodiments, compression module 250 may provide each of compressed content-layer streams 252(1) to 252(N) with a bandwidth that is not less than the minimal bandwidth value determined/predetermined for the content-layer associated with the respective content-layer stream.

For example, compression module 250 may provide first content-layer stream 252(1) associated with first content-layer 232(1) with a bandwidth value that is not less than 2 Mbps (e.g., according to first set of compression parameters 236(1), as shown in FIG. 2B). In the same example, compression module 250 may provide second content-layer stream 252(2) associated with second content-layer 232(2) with a bandwidth value that is not less than 1 Mbps (e.g., according to second set of compression parameters 236(2), as shown in FIG. 2B). Yet in the same example, compression module 250 may provide third content-layer stream 252(3) associated with third content-layer 232(3) with a bandwidth value that is not less than 0.75 Mbps (e.g., according to third set of compression parameters 236(3), as shown in FIG. 2B).

In some embodiments, compression module 250 may further distribute the available network resources (e.g., bandwidth) among compressed content-layer streams 252(1) to 252(N) according to the priority value determined/predetermined for the content-layer associated with the respective content-layer stream.

For example, if the available network bandwidth reduces to, for example, 3.25 Mbps (which is less than a sum of minimal bandwidth values determined for all content-layers 234 of 3.75 Mbps, as shown in FIG. 2B), compression module 252 may still provide first content-layer stream 252(1) associated with first content-layer 232(1) and second content-layer stream 252(2) associated with second content-layer 232(2) with their respective predetermined minimal bandwidth values of 2 Mbps and 1 Mbps, respectively. In the same example, compression module 250 may further provide third content-layer stream 252(3) associated with third content-layer 232(3) with the remaining bandwidth value of 0.25 Mbps instead of predetermined minimal bandwidth value of 0.75 Mbps, as third-content-layer 232(3) has lower predetermined priority value as compared to first and second content-layers 232(1), 232(2), respectively (e.g., as shown in FIG. 2B). Alternatively or complementarily, compression module 250 may provide third content-layer stream 252(3) with no bandwidth to thereby exclude third content-layer stream 252(3) from further processing.

In some embodiments, compression module 250 may generate for each frame of each of compressed content-layer streams 252(1) to 252(N) a sync metadata indicating at least a time point associated with the respective frame. Alternatively or complementarily, the sync metadata may be part of compression parameters 236 of predefined content-layers 232.

According to some embodiments, system 200 may include a video processing module 270. Video processing module 270 may be associated with video compression server 210 (e.g., over network 90).

In some embodiments, video processing module 270 may include decoding module 271. Decoding module 271 may decode each of at least two compressed content-layer streams 252(1) to 252(N) to yield corresponding at least two decoded content-layer streams 272(1) to 272(N) (e.g., a first decoded content-layer stream 272(1), a second decoded content-layer stream 272(2) and a third decoded content-layer stream 272(3), as shown in FIG. 2A). The decoding of each of compressed content-layer streams 252(1) to 252(N) may be based on the compression parameters (of compression parameters 236) of the content-layer (of predefined content-layers 232) associated with the respective compressed content-layer stream.

In some embodiments, video processing module 270 may include a fusion module 273. Fusion module 273 may fuse at least some of at least two decoded content-layer streams 272(1) to 272(N) into a fused decoded video stream 274 (e.g., using the sync metadata accompanying each frame of each of the content-layer streams 252(1) to 252(N), as described above with respect to FIG. 2A).

In various embodiments, video processing module 270 may broadcast at least some of at least two decoded content-layer streams 272(1) to 272(N) separately and/or may broadcast fused decoded video stream 274.

According to some embodiments, system 200 may include at least one target device 290. Target device(s) 290 may be, for example, smart TV, smartphone, tablet computer, etc. In some embodiments, video processing model 270 may be implemented on target device(s) 290 (e.g., as described above with respect to FIG. 1).

In various embodiments, target device(s) 290 may receive and utilize at least some of at least two decoded content-layer streams 272(1) to 272(N) separately and/or may receive and utilize fused decoded video stream 274 (e.g., as shown in FIG. 2A).

For example, if a user of a specific target device of target device(s) 190 is interested only in tracking players' 82 performance during the sport event, the respective target device may receive only first decoded content-layer stream 272(1) associated with first content-layer 234(1) (e.g., players 82). In another example, if a user of a specific target device of target device(s) 190 is interested in watching the whole sporting event, the respective target device may receive fused decoded video stream 274.

Figure 3:
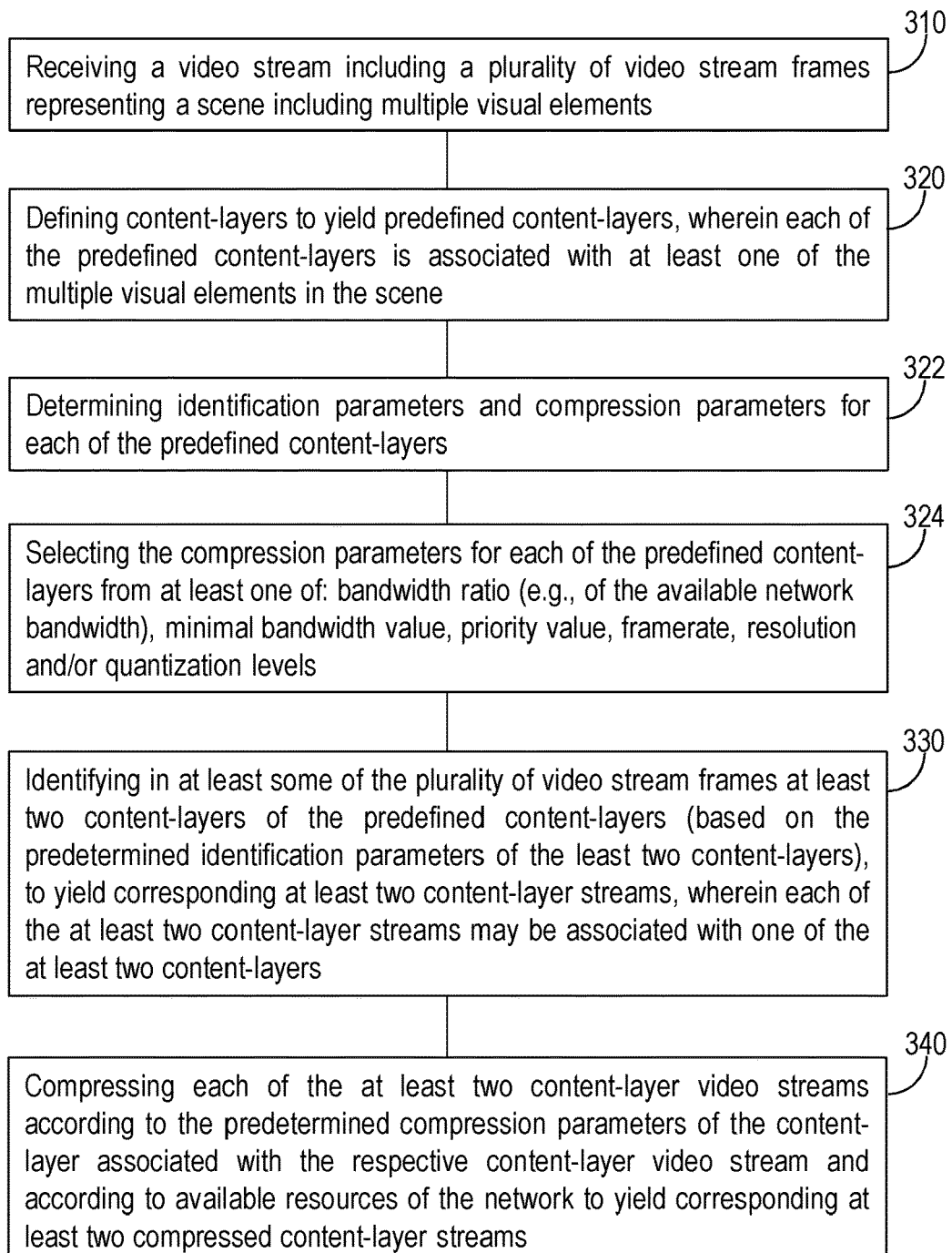
FIG. 3 is a flowchart of a method of content-layer based video compression, according to some embodiments of the invention.

Reference is now made to FIG. 3, which is a flowchart of a method 300 of content-layer based video compression, according to some embodiments of the invention.

Method 300 may be implemented by system 100 or by system 200, which may be configured to implement method 300. It is noted that method 300 is not limited to the flowcharts illustrated in FIG. 3 and to the corresponding description. For example, in various embodiments, method 300 needs not move through each illustrated box or stage, or in exactly the same order as illustrated and described.

Method 300 may include receiving a video stream including a plurality of video stream frames representing a scene including multiple visual elements (stage 310).

In some embodiments, method 300 may include defining content-layers to yield predefined content-layers, wherein each of the predefined content-layers is associated with at least one of the multiple visual elements in the scene (stage 320).

In some embodiments, method 300 may include determining identification parameters and compression parameters for each of the predefined content-layers (stage 322).

In some embodiments, method 300 may include selecting the compression parameters for each of the predefined content-layers from at least one of: bandwidth ratio (e.g., of the available network bandwidth), minimal bandwidth value, priority value, framerate, resolution and/or quantization levels (stage 324).

Method 300 may include identifying in at least some of the plurality of video stream frames at least two content-layers of the predefined content-layers (based on the predetermined identification parameters of the least two content-layers), to yield corresponding at least two content-layer streams, wherein each of the at least two content-layer streams may be associated with one of the at least two content-layers (stage 330).

Method 300 may include compressing each of the at least two content-layer video streams according to the predetermined compression parameters of the content-layer associated with the respective content-layer video stream and according to available resources of the network to yield corresponding at least two compressed content-layer streams (stage 340).

In some embodiments, method 300 may include providing each of the at least two compressed content-layer streams with a bandwidth that is not less than a minimal bandwidth value determined/predetermined for the content-layer associated with the respective content-layer stream (stage 342).

In some embodiments, method 300 may include distributing the available network resources among the at least two compressed content-layer streams according to the priority value determined/predetermined for the content-layer associated with the respective content-layer stream (stage 344).

In some embodiment, method 300 may include generating for each frame of each of the at least two content-layer streams a sync metadata indicating at least a time point associated with the respective frame (stage 346).

Method 300 may include decoding each of the at least two compressed content-layer streams, to yield corresponding at least two decoded content-layer streams (stage 350).

In some embodiments, method 300 may include broadcasting at least some of the at least two decoded content-layer streams separately (stage 352).

In some embodiments, method 300 may include fusing at least some of the at least two decoded content-layer streams into a fused decoded video stream and further broadcasting the fused decoded video stream thereof (stage 354).

In various embodiments, method 300 may include receiving at least some of the at least two decoded content-layer streams or the fused decoded video stream by at least one target device (stage 356).

Advantageously, the disclosed systems and methods may provide means for content-layer based compression of the video using any video compression formats known in the art. The disclosed systems and methods may manage the available network resources among predefined content-layers in the video footage according to user preferences (e.g., predetermined content-layers parameters). The management thereof may be configured to enhance the quality of the content-layers defined by the user as preferred, for example, at expense of other content-layers. Thus, the disclosed systems and methods may ensure that the user receives its preferred content at preferred/predetermined quality.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a fused embodiment, the features can also be provided separately or in any suitable combination. Conversely, although the invention can be described herein in the context of separate embodiments for clarity, the invention can also be implemented in a fused embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of content-layer based compression of a video being broadcasted over a network, the method comprising:
   receiving a video stream comprising a plurality of video stream frames;
   identifying in at least some of the plurality of video stream frames at least two content-layers of predefined content-layers to yield corresponding at least two content-layer streams, wherein each of the at least two content-layer streams is associated with one of the at least two content-layers;
   compressing each of the at least two content-layer video streams according to predetermined parameters of the content-layer associated with the respective content-layer video stream and according to available resources of the network to yield corresponding at least two compressed content-layer streams;
   decoding each of the at least two compressed content-layer streams, to yield corresponding at least two decoded content-layer streams; and
   broadcasting at least some of the at least two decoded content-layer streams separately and receiving the at least two decoded content-layer streams by at least one target device.

2. The method of claim 1, further comprising selecting the content-layer parameters for each of the predefined content-layers from at least one of: identification parameters, bandwidth ratio, minimal bandwidth value, priority value, framerate, resolution or quantization levels.

3. The method of claim 1, further comprising providing each of the at least two compressed content-layer streams with a bandwidth that is not less than a minimal bandwidth value predetermined for the content-layer associated with the respective content-layer stream.

4. The method of claim 1, further comprising distributing the available network resources among the at least two compressed content-layer streams according to the priority value predetermined for the content-layer associated with the respective content-layer stream.

5. The method of claim 1, further comprising fusing at least some of the at least two decoded content-layer streams into a fused decoded video stream, broadcasting the fused decoded video stream thereof and further receiving the fused decoded video stream by at least one target device.

6. A system for content-layer based compression of a video being broadcasted over a network, the system comprising:
  an identification module arranged to:
    receive a video stream comprising a plurality of video stream frames; and
    identify in at least some the plurality of video stream frames at least two content-layers of predefined content-layers, to yield corresponding at least two content-layer streams, wherein each of the at least two content-layer streams is associated with one of the at least two content-layers;
  a compression module arranged to compress each of the at least two content-layer video streams according to predetermined parameters of the content-layer associated with the respective content-layer video stream and according to available resources of the network to yield corresponding at least two compressed content-layer streams;
  a video processing module arranged to decode each of the at least two compressed content-layer streams, to yield corresponding at least two decoded content-layer streams; and
  at least one target device associated with the video processing module, wherein the video processing module is further arranged to broadcast at least some of the at least two decoded content-layer streams separately to the at least one target device.

7. The system of claim 6, the content-layer parameters of each of the predefined content-layers comprise at least one of: identification parameters, bandwidth ratio, minimal bandwidth value, priority value, framerate, resolution or quantization levels.

8. The system of claim 6, wherein the compression module is further arranged to provide each of the at least two compressed content-layer streams with a bandwidth that is not less than a minimal bandwidth value predetermined for the content-layer associated with the respective content-layer stream.

9. The system of claim 6, wherein the compression module is further arranged to distribute the available network resources among the at least two compressed content-layer streams according to the priority value predetermined for the content-layer associated with the respective content-layer stream.

10. The system of claim 6, further comprising at least one target device associated with the video processing module, wherein the video processing module is arranged to fuse at least some of the at least two decoded content-layer streams into a fused decoded video stream and to broadcast the fused decoded video stream thereof to the at least one target device.

11. The system of claim 6, wherein the video processing module is implemented on the at least one target device.

* * * * *